United States Patent Office.

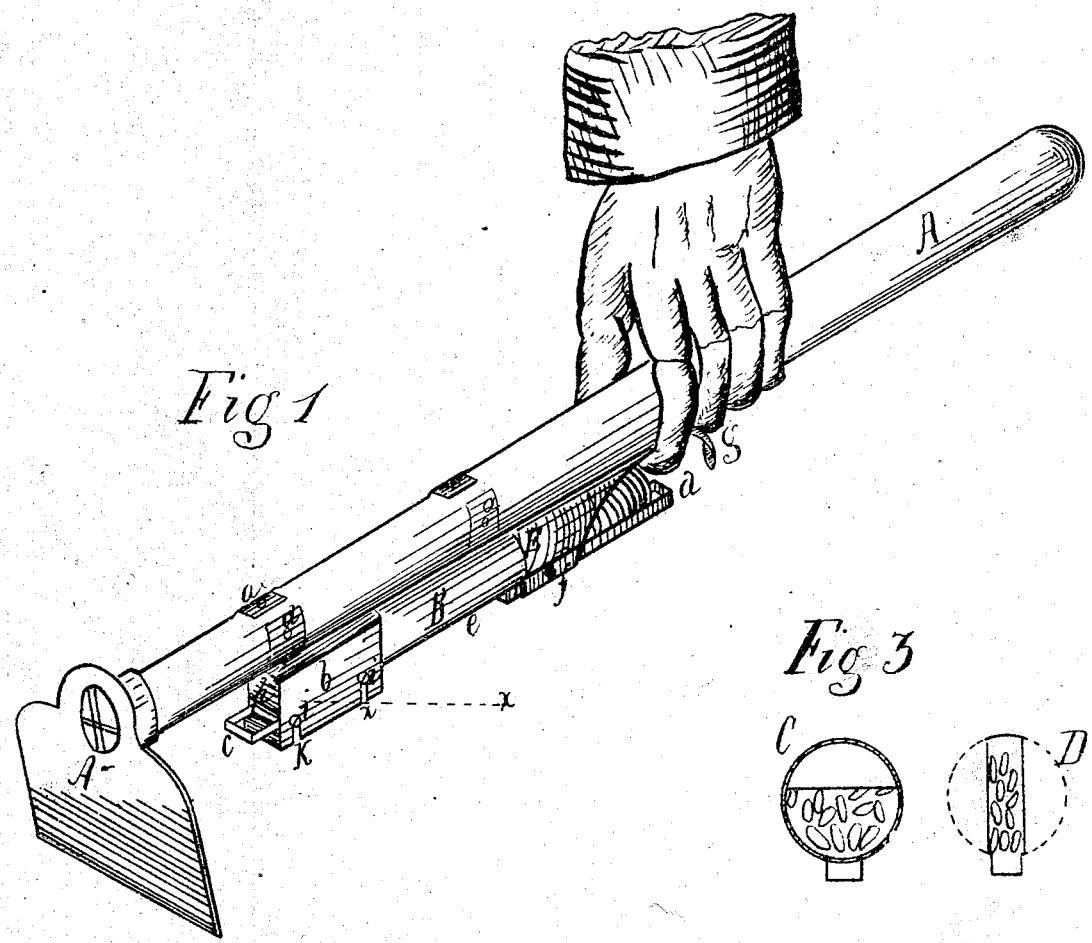

HENRY P. GREGG, OF CINCINNATI, OHIO.

Letters Patent No. 75,749, dated March 24, 1868.

IMPROVEMENT IN CORN-PLANTERS.

The Schedule referred to in these Letters Patent and making part of the same.

TO ALL WHOM IT MAY CONCERN:

Be it known that I, HENRY P. GREGG, of Cincinnati, county of Hamilton, and State of Ohio, have invented a new and useful Improvement for Planting Corn; and I do hereby declare that the following is a full, clear, and exact description of the construction and operation of the same, reference being had to the annexed drawings making a part of this specification, in which—

Figure I is a planting-attachment to a hoe in perspective.
Figure II, an under view of the same.
Figure III, a section of the narrow end of tube taken in the line $x$ of Fig. I.
Similar letters of reference indicate like parts.

This invention relates to the construction of an attachment to a hoe for planting corn, &c., and consists in securing a tubular receptacle for the grain underneath the handle of the hoe, and is provided with a measuring-cup and brush for discharging a desired number of grains at each movement of said cup, the cup being operated by a suitable finger-piece attached thereto.

The object of my invention is to overcome certain objections found in other inventions for the same purpose. It is found in practice, where the measuring-cup is placed directly under a body of corn or other grain the grains crowd each other, and are apt to clog the entrance of the cup, as may be seen by reference to Fig. III, letter C; whereas, when the receptacle is constructed as seen at $b$, Fig. I, the grains are pre-arranged, and easily fill the cup, D, Fig. III. It is further found, where the measuring-cup is adjusted from any of its sides, it is almost sure to obstruct the grains when but a few are to be dropped, as the peculiar shape and size of the grains are such as to require a certain-sized mouth for their entrance. When, therefore, it is required to decrease the size of the cup more than the nature of the grains will permit, they will not enter the cup with certainty. For this reason it is necessary to adjust the cup from bottom to top, which is accomplished in my invention by reversing the ends of slat $e$, which gives a greater or less depth of cup, as may be desired.

To enable others skilled in the art to make and use my invention, I will proceed to describe its construction and operation.

I use an ordinary hoe, A A, and secure to its handle the attachment by the loops $a\ a\ a$. B is the tube, containing the grain to be planted, which tube is narrowed at its lower end, as seen at $b$. At $c$ and $d$ are two measuring-cups of varying depths, connected by the slat $e$ under the tube B. E is a band, loosely encircling the tube, and is connected to the slat by the rivet $f$, and terminating in a hook, $g$, which is held by the finger. At $h$ is a brush, which closes the end of the tube and strips the corn off the cups.

The operation of my invention is as follows: When it is desired to drop a hill of corn, the finger-piece $g$ is depressed, which causes the cup $c$ to emerge from under the brush, and, as it passes without, discharges the grains on the ground, which are then covered by the hoe in the usual manner. When it is desired to increase the number of grains in a small degree only, the block of wood $l$ can be moved into the cup $c$, in the usual way. But in case the number of grains is to be considerably varied, this is accomplished, as above stated, by withdrawing the rivet $f$, and reversing the cups, which gives the cup $d$ greater depth, and the operation continues as before. $i\ i$ are screws, which hold the block of wood $l$ up against the cup, and moves in the slots $k\ k$.

I am aware that attachments have been made to hoes for planting corn and other seeds, such as a movable tube or hopper, and also a canvas bag or pouch, &c., and these I do not claim; but

What I claim, and desire to secure by Letters Patent, is—

1. The manner of adjusting the cups $c$ and $d$ in their depth by reversing them, for the purpose described.

2. The narrow chute or ante-chamber $b$, for the purpose of pre-arranging the grains before entering the cup, as specified.

3. The combination of a movable reversible measuring-cup, with a stationary tube, when attached to a hoe, for the purpose herein set forth.

H. P. GREGG.

Witnesses:
   JOHN ELLIS,
   EUGENE DAYTON.